United States Patent
Moore et al.

(10) Patent No.: US 10,421,432 B2
(45) Date of Patent: Sep. 24, 2019

(54) TAMPER RESISTANT LOCK ASSEMBLY HAVING PHYSICAL UNCLONABLE FUNCTIONS

(71) Applicant: Intel Corporation, Santa Clara, CA (US)

(72) Inventors: Victoria C. Moore, Phoenix, AZ (US); Ned M. Smith, Beaverton, OR (US); Digvijay A. Raorane, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 15/608,297

(22) Filed: May 30, 2017

(65) Prior Publication Data

US 2018/0345904 A1    Dec. 6, 2018

(51) Int. Cl.
*B60R 25/01* (2013.01)
*H04L 9/32* (2006.01)
*G07C 9/00* (2006.01)

(52) U.S. Cl.
CPC .......... *B60R 25/01* (2013.01); *G07C 9/00174* (2013.01); *G07C 9/00857* (2013.01); *G07C 9/00896* (2013.01); *H04L 9/3278* (2013.01); *G07C 9/00706* (2013.01)

(58) Field of Classification Search
None
See application file for complete search history.

(56) References Cited

U.S. PATENT DOCUMENTS

| 6,380,842 | B1 * | 4/2002 | Mattes | B60R 25/04 307/10.2 |
| 6,457,337 | B1 * | 10/2002 | Hattick | G07C 9/00944 70/278.3 |
| 8,074,481 | B2 * | 12/2011 | Bass | E05B 19/00 307/10.1 |

* cited by examiner

*Primary Examiner* — K. Wong
(74) *Attorney, Agent, or Firm* — Barnes & Thornburg LLP

(57) ABSTRACT

A user-customizable locking assembly includes a user-customizable key, a user-customizable key receiver, and a key receiver receptacle. Each of the user-customizable key, a user-customizable key receiver, and a key receiver receptacle includes a physical unclonable function (PUF) circuit configured to provide a PUF response in response to receiving a challenge signal. The PUF circuits of the user-customizable key and a user-customizable key receiver include personalization fuses that allow a user to further personalize or change the PUF response produced by the corresponding PUF circuits. The key receiver receptacle also includes anti-theft fuses, which are activated if the user-customizable key receiver is removed from the key receiver receptacle. In use, a protected system may utilize the PUF responses from the each of the PUF circuits to authenticate the user-customizable locking assembly.

25 Claims, 9 Drawing Sheets

TAMPER RESISTANT LOCK ASSEMBLY HAVING PHYSICAL UNCLONABLE FUNCTIONS

BACKGROUND

Current locking systems are often electronically controlled. For example, many vehicles such as cars and trucks include locking systems controlled by one or more electronic control units (ECUs), electronic control modules (ECMs), or other electronic controllers. ECU-controlled locking systems may be used, for example, to lock external vehicle doors or to control the vehicle ignition. As an illustrative example, an ECU may unlock the vehicle by sending an electrical signal to a relay that activates a lock solenoid to physically unlock the vehicle. In addition to mechanical keys, ECU-controlled locking systems may also allow remote operation through communication with a transponder key, key fob, or other device using radio frequency-based signal technologies.

Physical unclonable functions (PUFs) are electronic circuits or other electronic devices that, in response to receiving a challenge signal, generate a response signal. For example, a PUF circuit may receive a voltage signal, a power signal, or other electronic signal and generate a response voltage signal, current signal, or other electrical response. Due to manufacturing variations, the response of each PUF to the challenge signal is unique and cannot be copied in another PUF. Additionally, each PUF may include or be otherwise coupled to one or more fuses, switches, or other one-time-use devices that, when activated, modify the response of the PUF to the challenge signal.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
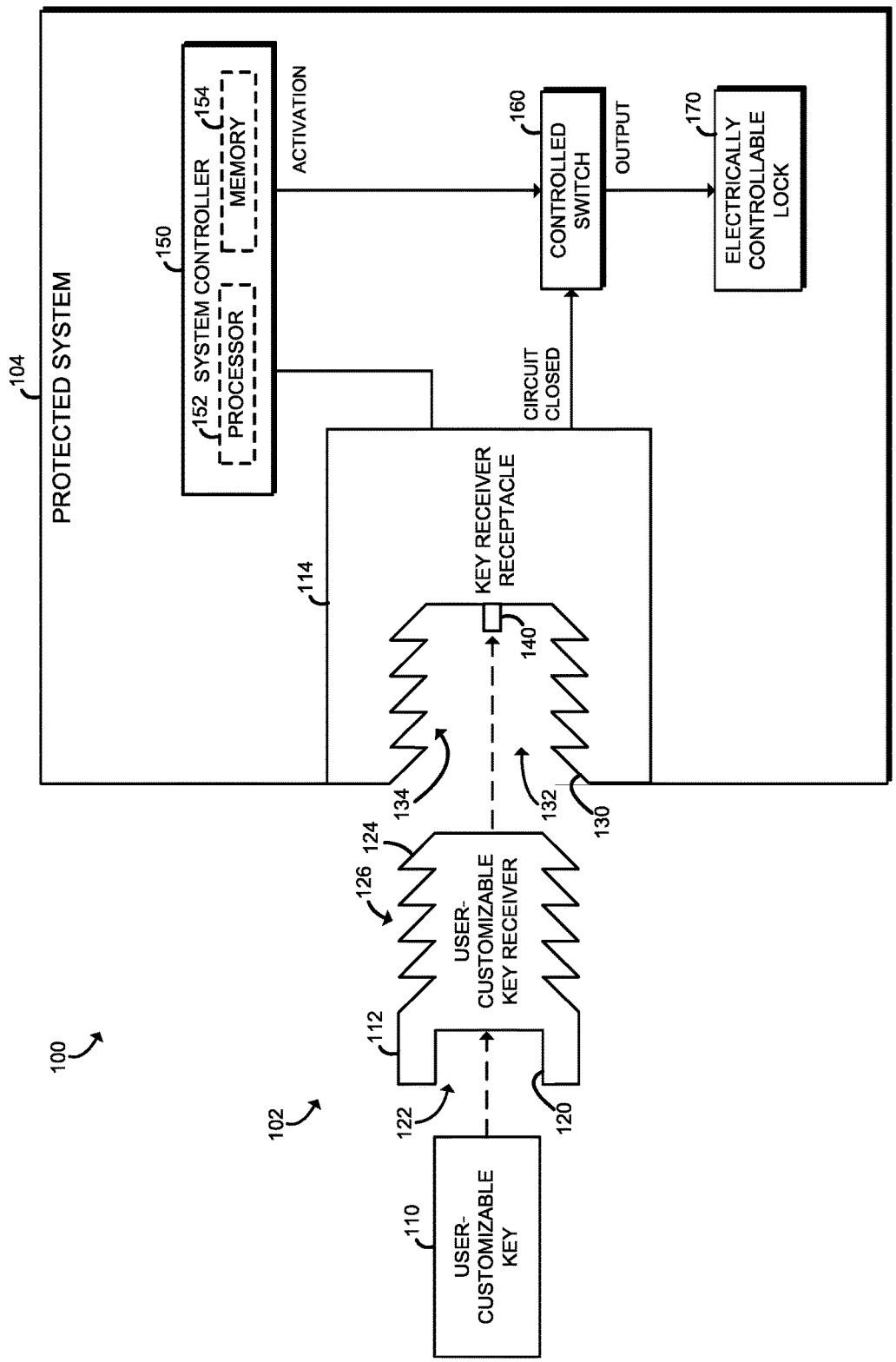
FIG. 1 is a simplified block diagram of at least one embodiment of a tamper resistant lock system having user-customizable locking assembly.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative tamper resistant lock system 100 includes a user-customizable locking assembly 102. The user-customizable locking assembly 102 includes a user-customizable key 110, a user-customizable key receiver 112, and a key receiver receptacle 114. As shown, the key receiver receptacle 114 is included in a protected system 104, which may be embodied as a vehicle such as a car or truck or other system that is protected by the locking assembly 102.

The user-customizable key 110 may be embodied as any electronic access key, key fob, electronic token, or other device to allow a user to unlock or otherwise access the protected system 104. The user-customizable key receiver 112 includes an aperture 122 defined by an inner wall 120. As shown, the aperture 122 of the user customizable key receiver 112 receives at least a part of the user-customizable key 110. As described further below, when the user-customizable key 110 is inserted in the user-customizable key receiver 112, the user-customizable key 110 and the user-customizable key receiver 112 are in electrical communication. In some embodiments, the user-customizable key 110 and the user-customizable key receiver 112 may also include mechanical locking features. For example, the user-customizable key 110 may include a surface that defines a key profile, and the user-customizable key receiver 112 may include one or more mechanical tumblers that may be activated by the key profile. In some embodiments, the user-customizable key 110 and the user-customizable key receiver 112 may be modular and flexible in design, allowing the user to configure the user-customizable key 110.

Similarly, the key receiver receptacle 114 includes an aperture 132 that is defined by an inner wall 130. The aperture 132 of the key receiver receptacle 114 receives at least a part of the user-customizable key receiver 112. The inner wall 130 of the key receiver receptacle 114 further includes locking features 134. The locking features 134 correspond to locking features 126 defined in an outer wall 124 of the user-customizable key receiver 112. When the user-customizable key receiver 112 is inserted in the key receiver receptacle 114, the locking features 126, 134 may engage and mechanically lock the user-customizable key receiver 112 into the key receiver receptacle 114. Thus, in some embodiments, the user-customizable key receiver 112 may be inserted into the key receiver receptacle 114 only once, and removing the user-customizable key receiver 112 may require damaging, tampering with, or otherwise modifying the key receiver receptacle 114. When the user-customizable key receiver 112 is inserted in the key receiver receptacle 114, the user-customizable key receiver 112 and the key receiver receptacle 114 are in electrical communication. As shown, the key receiver receptacle 114 includes an anti-theft sensor 140 that may be engaged or otherwise activated when the user-customizable key receiver 112 is inserted into the key receiver receptacle 114. As described further below, the anti-theft sensor 140 may be used to detect if the user-customizable key receiver 112 is removed from the key receiver receptacle 114.

As shown, the protected system 104 further includes a system controller 150, a controlled switch 160, and an electrically controllable lock 170. The system controller 150 may be embodied as any type of device capable of performing the functions described herein. For example, the system controller 150 may be embodied as, without limitation, an electronic control unit (ECU), an electronic control module (ECM), an embedded computing device, a computer, an application-specific integrated circuit (ASIC), or any other controller and/or control circuit. In some embodiments, the system controller 150 may include a processor 152 and a memory 154. The processor 152 may be embodied as any type of processor capable of performing the functions described herein, such as a single or multi-core processor(s), digital signal processor, microcontroller, ASIC, or other processor or processing/controlling circuit. Similarly, the memory 154 may be embodied as any type of volatile or non-volatile memory or data storage capable of performing the functions described herein, such as DRAM, 3D XPoint™ memory, or other memory technology.

In use, the system controller 150 may receive a request from the user customizable locking assembly 102 to unlock the protected system 104. The system controller 150 sends a challenge signal to a physical unclonable function (PUF) of each component of the user customizable locking assembly 102 (i.e., the user-customizable key 110, the user-customizable key receiver 112, and the key receiver receptacle 114). In response to authenticating a response from each PUF of the user customizable locking assembly 102, the system controller 150 sends an activation signal to the controlled switch 160 (e.g., a relay or other electrically controlled switch), which in response may send an output signal to the electrically controllable lock 170, which unlocks the protected system 104. As described further below, the key receiver receptacle 114 is also electrically coupled to the controlled switch 160, and the controlled switch 160 may not generate the output signal unless the user-customizable key receiver 112 and the user-customizable key 110 are physically connected to the key receiver receptacle 114. In some embodiments, the key receiver receptacle 114 may send a signal to the controlled switch 160 to indicate when the user-customizable key receiver 112 and the user-customizable key 110 are physically connected to the key receiver receptacle 114, for example when a circuit loop is closed as described below. The system controller 150 may perform a similar process to lock the protected system 104.

Accordingly, the system 100 may improve security by authenticating with a PUF challenge-response to the system controller 150 that cannot be duplicated by an attacker or manufacturer. Additionally, the key receiver receptacle 114 may include anti-theft triggering to allow the system controller 150 to detect if the user-customizable key receiver 112 is removed from the key receiver receptacle 114. By requiring the physical presence of the user-customizable key 110 and the user-customizable key receiver 112, the system 100 may also protect against malware attacks to the system controller 150. For example, malware that completely compromises the system controller 150 cannot activate the controlled switch 160 without the physical presence of the user-customizable key receiver 112 and the user-customizable key 110.

Figure 2:
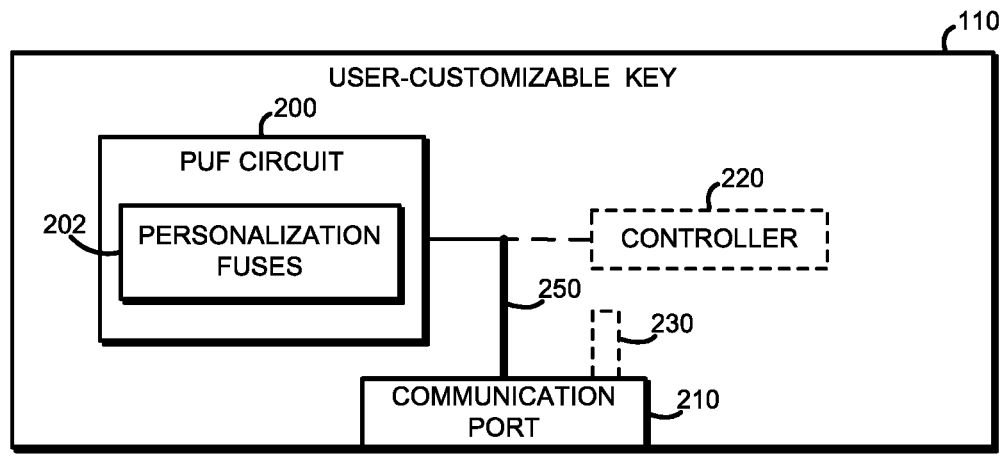
FIG. 2 is a simplified block diagram of at least one embodiment of a user-customizable key of the user-customizable locking assembly of the system of FIG. 1.

Referring now to FIG. 2, an illustrative embodiment of a user-customizable key 110 is shown. As shown, the user-customizable key 110 includes a PUF circuit 200. The PUF circuit 200 includes one or more personalization fuses 202, which may be embodied as any fuse, switch, or other one-time-use device that, when activated, modifies the response of the PUF circuit 200. The PUF circuit 200 is coupled to a communication port 210, which may be embodied as any electrical communication pad, port, or other device or collection of devices that enables the user-customizable key 110 to communicate with other devices. In particular, the communication port 210 may couple with a corresponding port of the user-customizable key receiver 112. The communication port 210 may be used to receive a challenge signal from the system controller 150 and to send back a corresponding response. In some embodiments, the user-customizable key 110 may also include a controller 220, which may be embodied as any type of processor or other processing/controlling circuit, such as a single or multi-core processor(s), digital signal processor, microcontroller, or other controller.

As shown, the user-customizable key 110 also includes part of a circuit loop 230. As described further below, the user-customizable key receiver 112 and the key receiver receptacle 114 also include parts of the circuit loop 230. When the user-customizable key 110 is inserted in the user-customizable key receiver 112 and the user-customizable key receiver 112 is inserted in the key receiver receptacle 114, the circuit loop 230 is completed and may close an electrical circuit with the controlled switch 160. The controlled switch 160 may only activate the electrically controllable lock 170 when the circuit loop 230 closes the electrical circuit with the controlled switch 160.

The user-customizable key 110 may further include an internal bus 250 that is coupled to the PUF circuit 200, the communication port 210, the controller 220, and/or the circuit loop 230. The bus 250 may be embodied as or otherwise include communication links (i.e., point-to-point links, bus links, wires, cables, light guides, printed circuit board traces, etc.), controller hubs, and/or other components and subsystems to facilitate communications between the various components of the user-customizable key 110.

Figure 3:
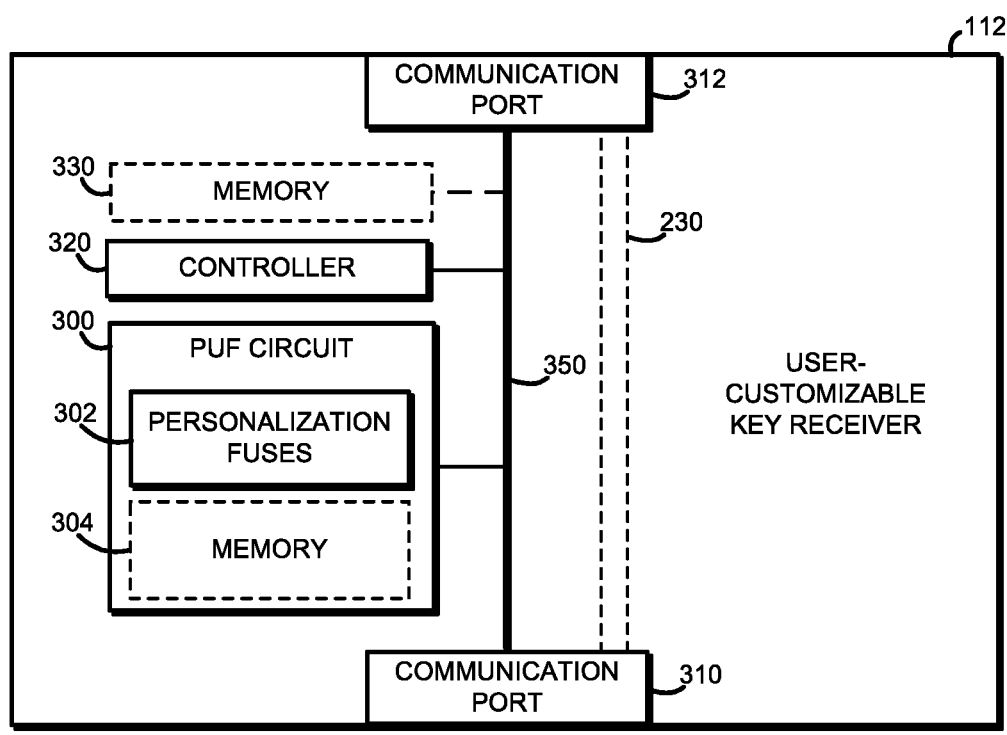
FIG. 3 is a simplified block diagram of at least one embodiment of a user-customizable key receiver of the user-customizable locking assembly of the system of FIG. 1.

Referring now to FIG. 3, an illustrative embodiment of a user-customizable key receiver 112 is shown. As shown, the user-customizable key receiver 112 includes a PUF circuit 300. Similar to the PUF circuit 200, the PUF circuit 300 includes one or more personalization fuses 302, which may be embodied as any fuse, switch, or other one-time-use device that, when activated, modifies the response of the PUF circuit 300. In some embodiments, the PUF circuit 300 may also include a memory 304. The memory 304 may be embodied as, for example, a domain wall (DW) memory or other memory device used to construct the PUF circuit 300. The memory 304 may be used to store a secret such as a user PIN value, as described further below. The PUF circuit 300 is coupled to a communication port 310, which may be embodied as any electrical communication pad, port, or other device or collection of devices that enables the user-customizable key receiver 112 to communicate with other devices. In particular, the communication port 310 may couple with a corresponding port of the key receiver receptacle 114. The communication port 310 may be used to receive a challenge signal from the system controller 150 and to send back a corresponding response. The user-customizable key receiver 112 further includes a communication port 312, which may be coupled to the communication port 210 of the user-customizable key 110.

As shown, the user-customizable key receiver 112 includes a controller 320, which may be embodied as any type of processor or other processing/controlling circuit, such as a single or multi-core processor(s), digital signal processor, microcontroller, or other controller. The controller 320 may be configured to generate, store, and/or retrieve the user PIN value. In some embodiments, the user-customizable key receiver 112 may further include a memory 330, which may be embodied as any type of volatile or non-volatile memory or data storage external to the PUF circuit 300 and otherwise capable of performing the functions described herein. In some embodiments, the memory 330 may be used to the store the user PIN value. The user-customizable key receiver 112 further includes a part of the circuit loop 230, as described above.

As shown, the user-customizable key receiver 112 may further include an internal bus 350 that is coupled to the PUF circuit 300, the communication ports 310, 312, the controller 320, the memory 330, and/or the circuit loop 230. The bus 350 may be embodied as or otherwise include communication links (i.e., point-to-point links, bus links, wires, cables, light guides, printed circuit board traces, etc.), controller hubs, and/or other components and subsystems to facilitate communications between the various components of the user-customizable key receiver 112.

Figure 4:
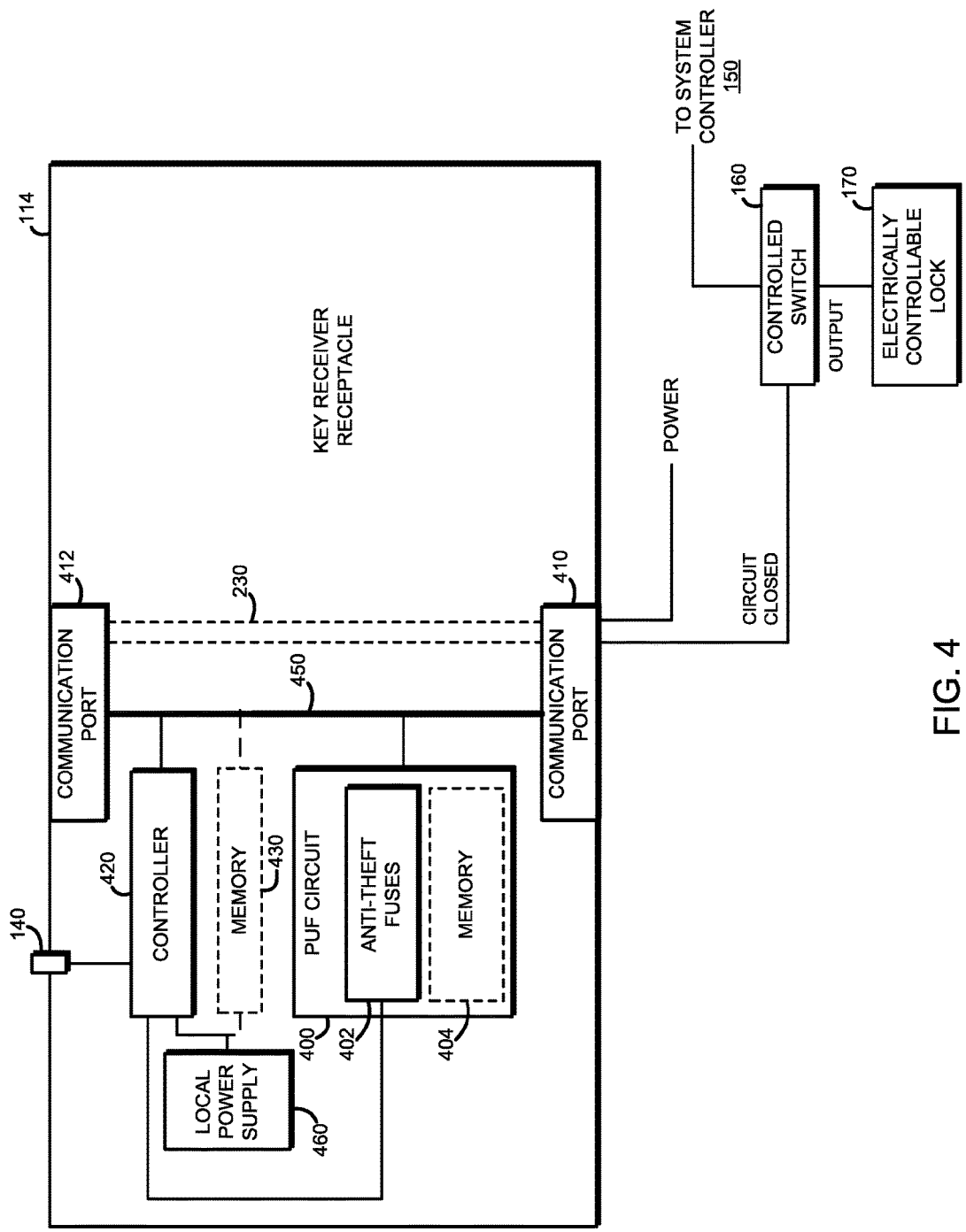
FIG. 4 is a simplified block diagram of at least one embodiment of a key receiver receptacle of the user-customizable locking assembly of the system of FIG. 1.

Referring now to FIG. 4, an illustrative embodiment of a key receiver receptacle 114 is shown. As shown, the key receiver receptacle 114 includes a PUF circuit 400. The PUF circuit 400 includes one or more anti-theft fuses 402, which may be embodied as any fuse, switch, or other one-time-use device that, when activated, modifies the response of the PUF circuit 400. In some embodiments, the PUF circuit 400 may also include a memory 404. The memory 404 may be embodied as, for example, a domain wall (DW) memory or other memory device used to construct the PUF circuit 400. The PUF circuit 400 is coupled to a communication port 410, which may be embodied as any electrical communication pad, port, or other device or collection of devices that enables the key receiver receptacle 114 to communicate with other devices. In particular, the communication port 410 may be coupled with the controlled switch 160, the system controller 150, and/or other components of the protected system 104, and may be used to receive a challenge signal from the system controller 150 and to send back a corresponding response. The key receiver receptacle 114 further includes a communication port 412, which may be coupled to the communication port 310 of the user-customizable key receiver 112.

As shown, the key receiver receptacle 114 includes a controller 420, which may be embodied as any type of processor or other processing/controlling circuit, such as a single or multi-core processor(s), digital signal processor, microcontroller, or other controller. The controller 420 is coupled to the anti-theft sensor 140 and the anti-theft fuses 402. The anti-theft sensor 140 may be embodied as any switch, proximity sensor, or other sensor configured to detect when the user-customizable key receiver 112 is inserted in the key receiver receptacle 114. As described further below, the controller 420 may be configured to monitor the anti-theft sensor 140 to determine if the user-customizable key receiver 112 is removed from the key receiver receptacle 114, and if removed, to blow one or more of the anti-theft fuses 402.

In some embodiments, the key receiver receptacle 114 may further include a memory 430, which may be embodied as any type of volatile or non-volatile memory or data storage external to the PUF circuit 400 and otherwise capable of performing the functions described herein. The key receiver receptacle 114 further includes a part of the circuit loop 230 as described above. As shown, the key receiver receptacle 114 may further include an internal bus 450 that is coupled to the PUF circuit 400, the communication ports 410, 412, the controller 420, the memory 430, and/or the circuit loop 230. The bus 450 may be embodied as or otherwise include communication links (i.e., point-to-point links, bus links, wires, cables, light guides, printed circuit board traces, etc.), controller hubs, and/or other components and subsystems to facilitate communications between the various components of the key receiver receptacle 114. As shown, the key receiver receptacle 114 further includes a local power supply 460 coupled to the controller 420 and/or the memory 430. The key receiver receptacle 114 may also receive power from the protected system 104 (e.g., from a vehicle electrical system). The local power supply 460 may be embodied as a battery, a capacitor, and/or any other power supply that is capable of supplying power when the power supply of the protected system 104 is powered off or otherwise interrupted.

Figure 5:
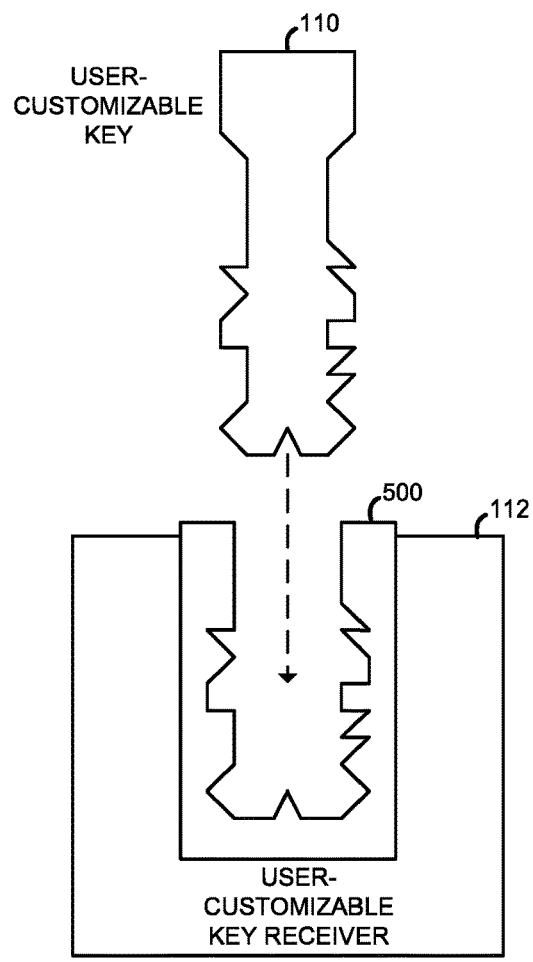
FIG. 5 is a simplified cross-sectional diagram of another embodiment of the user-customizable key of FIG. 2 and the user-customizable key receiver of FIG. 3.

Referring now to FIG. 5, a cross-sectional view of one embodiment of the user-customizable key 110 and the user-customizable key receiver 112 is shown. In some embodiments, the user-customizable key receiver 112 may include a three-dimensionally printed portion 500 that defines an aperture. In some embodiments, the portion 500 may be an integral part of the user-customizable key receiver 112. The user-customizable key 110 similarly includes a three-dimensionally printed portion that is received in the aperture of the three-dimensionally printed portion 500. The shape of the three-dimensionally printed portion 500 may be personalized or otherwise determined by the user of the user-customizable locking system 102. Thus, by including three-dimensionally printed portions, the user-customizable key 110 and the user-customizable key receiver 112 may be mechanically personalized, which may improve resistance to copying by the manufacturer and/or other parties.

Figure 6:
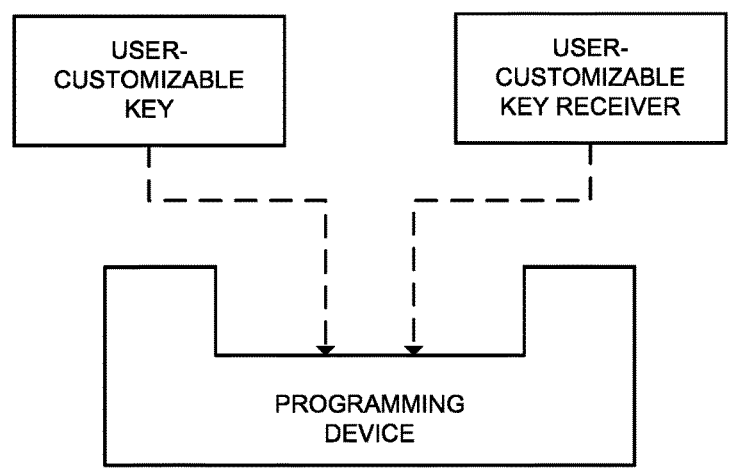
FIG. 6 is a simplified block diagram of at least one embodiment of a programming device usable with the user-customizable key of FIG. 2 and/or the user-customizable key receiver of FIG. 3.

Referring now to FIG. 6, at least one embodiment of a programming device usable with the user-customizable key 110 and/or the user-customizable key receiver 112 is shown. The programming device may be embodied as any programmer or other computing device capable of configuring the personalization fuses 202, 302 of the user-customizable key 110 or the user-customizable key receiver 112, respectively. The programming device may also be capable of configuring the memory of the user-customizable key receiver 112. As further described below, in some embodiments the fuses of the user-customizable key 110 and/or the user-customizable key receiver 112 may be configured without using an external programming device.

Figure 7:
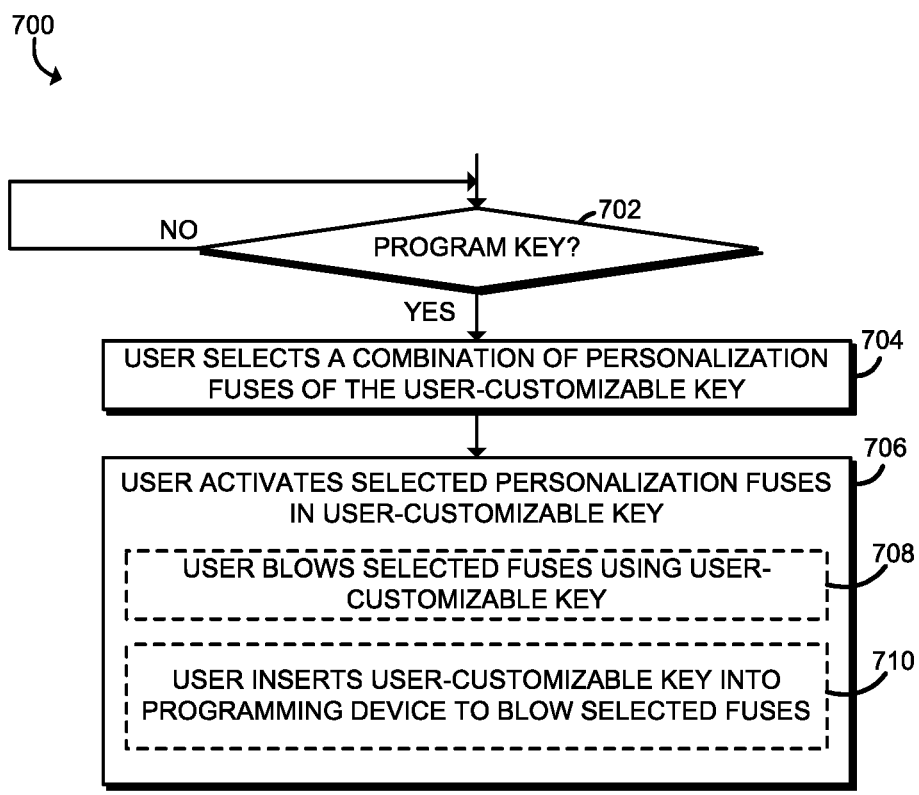
FIG. 7 is a simplified flow diagram of at least one embodiment of a method for programming the user-customizable key of FIG. 2.

Referring now to FIG. 7, a method 700 may be performed for programming the user-customizable key 110. The method 700 begins in block 702, in which a user determines whether to program the user-customizable key 110. The user may program the user-customizable key 110, for example, when initially purchasing, delivering, or otherwise provisioning the protected system 104. If the user determines not to program the user-customizable key 110, the method 700 loops back to block 702 and continues to determine whether to program the user-customizable key 110. If the user determines to program the user-customizable key 110, the method 700 advances to block 704.

In block 704, the user selects a combination of one or more personalization fuses 202 of the user-customizable key 110. The combination of personalization fuses 202 may be a secret value known to the user, a random value, or any other value that is not known at the time of manufacture of the user-customizable key 110. In block 706, the user activates the selected personalization fuses 202 in the user-customizable key 110. For example, the user may blow the personalization fuses 202 or use another one-time-use activation mechanism to activate the selected personalization fuses 202.

The user may use any appropriate technique to activate the personalization fuses 202. In some embodiments, in block 708 the user may blow the selected fuses 202 using the user-customizable key 110 directly, for example with a user interface of the user-customizable key 110. In some embodiments, in block 710 the user may insert the user-customizable key 110 into a programming device to blow the selected personalization fuses 202, as described above in connection with FIG. 6. After activating the selected personalization fuses 202, the method 700 is completed. The method 700 may be performed by the user only once for each user-customizable key 110, because each of the personalization fuses 202 may be activated only once. As described above, activating the selected personalization fuses 202 modifies the response generated by the PUF circuit 200 to a challenge signal. Thus, after activating the personalization fuses 202, the response of the user-customizable key 110 is personalized to the user and cannot be reproduced or predicted by the manufacturer of the user-customizable key 110.

Figure 8:
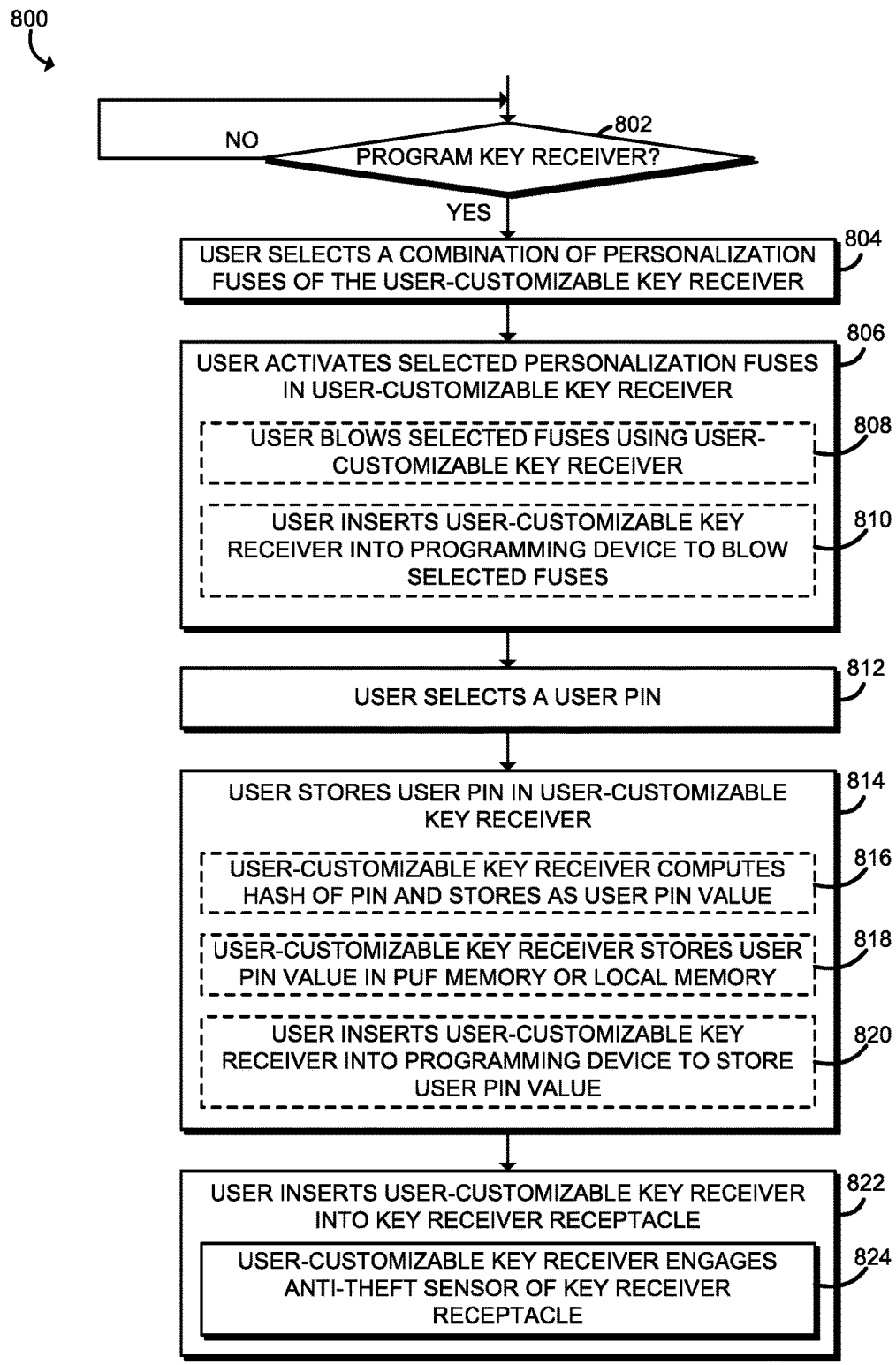
FIG. 8 is a simplified flow diagram of at least one embodiment of a method for programming the user-customizable key receiver of FIG. 3.

Referring now to FIG. 8, a method 800 may be performed for programming the user-customizable key receiver 112. The method 800 begins in block 802, in which a user determines whether to program the user-customizable key receiver 112. The user may program the user-customizable key receiver 112, for example, when initially purchasing, delivering, or otherwise provisioning the protected system 104. If the user determines not to program the user-customizable key receiver 112, the method 800 loops back to block 802 and continues to determine whether to program the user-customizable key receiver 112. If the user determines to program the user-customizable key receiver 112, the method 800 advances to block 804.

In block 804, the user selects a combination of one or more personalization fuses 302 of the user-customizable key receiver 112. The combination of personalization fuses 302 may be a secret value known to the user, a random value, or any other value that is not known at the time of manufacture of the user-customizable key receiver 112. In block 806, the user activates the selected personalization fuses 302 in the user-customizable key receiver 112. For example, the user may blow the personalization fuses 302 or use another one-time-use activation mechanism to activate the selected personalization fuses 302. The user may use any appropriate technique to activate the personalization fuses 302. In some embodiments, in block 808 the user may blow the selected fuses 302 using the user-customizable key receiver 112 directly, for example with a user interface of the user-customizable key receiver 112. In some embodiments, in block 810 the user may insert the user-customizable key receiver 112 into a programming device to blow the selected personalization fuses 302, as described above in connection with FIG. 6.

In block 812, the user selects a personal identification number (PIN). The PIN may be embodied as any secret value known to the user, and may be used to authenticate the user-customizable key receiver 112. Thus, the PIN may be embodied as a number, a password, a passphrase, or other secret value.

In block 814, the user stores the PIN in the user-customizable key receiver 112. The user may use any technique to store the PIN in the user-customizable key receiver 112, for example inputting the PIN using a user interface of the user-customizable key receiver 112. In some embodiments, in block 816 the user-customizable key receiver 112 may compute a hash of the PIN and store the hash value as the user PIN value. In some embodiments, in block 818 the user-customizable key receiver 112 may store the user PIN value in the PUF memory 304 and/or in a local memory 330 of the user-customizable key receiver 112. The user PIN value may be embodied as, for example, the PIN input by the user or a hash of the PIN. In some embodiments, in block 820, the user may insert the user-customizable key receiver 112 into a programming device to store the user PIN value, as described above in connection with FIG. 6.

After the user PIN value is stored, in block 822 the user inserts the user-customizable key receiver 112 into the key receiver receptacle 114. As described above, the user-customizable key receiver 112 may mechanically engage the key receiver receptacle 114 and be locked in place. In block 824, the user-customizable key receiver 112 engages the anti-theft sensor 140 of the key receiver receptacle 114. Thus, the system controller 150 may be capable of determining whether the user-customizable key receiver 112 is subsequently removed from the key receiver receptacle 114. After inserting the user-customizable key receiver 112 into the key receiver receptacle 114, the method 800 is completed. The method 800 may be performed by the user only once for each user-customizable key receiver 112, because each of the personalization fuses 302 may be activated only once. As described above, activating the selected personalization fuses 302 modifies the response generated by the PUF circuit 300 to a challenge signal. Thus, after activating the personalization fuses 302, the response of the user-customizable key receiver 112 is personalized to the user and cannot be reproduced or predicted by the manufacturer of the user-customizable key receiver 112.

Figure 9:
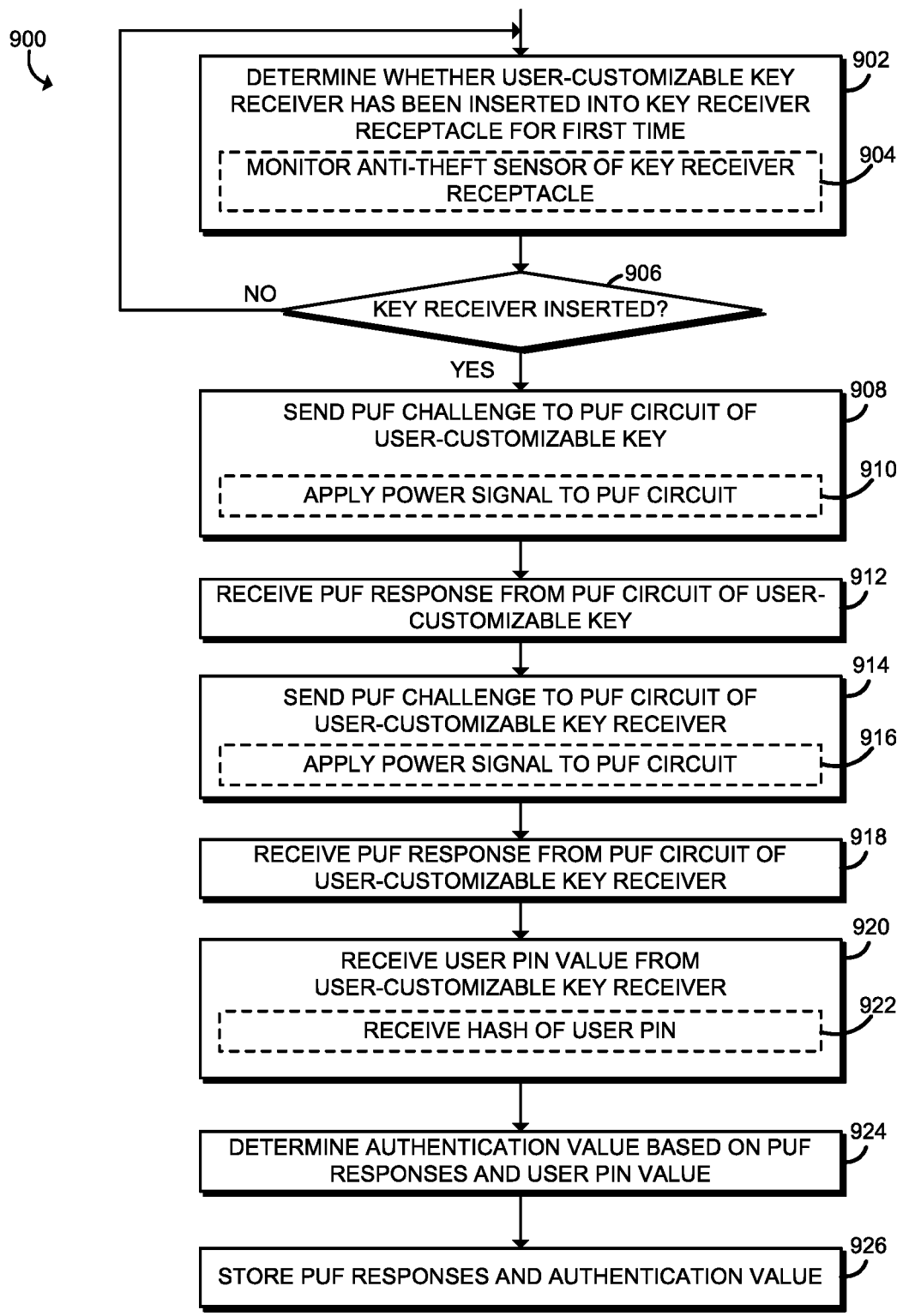
FIG. 9 is a simplified flow diagram of at least one embodiment of a method for initializing the user-customizable locking assembly of FIG. 1.

Referring now to FIG. 9, in use, the system controller 150 may execute a method 900 for initializing the user-customizable locking assembly 102. The method 900 begins in block 902, in which the system controller 150 determines whether a user-customizable key receiver 112 has been inserted into the key receiver receptacle 114 for the first time. The user-customizable key receiver 112 may be inserted, for example, in connection with the method 800 of FIG. 8, described above. The system controller 150 may use any technique to determine whether the user-customizable key receiver 112 has been inserted. In some embodiments, in block 904 the system controller 150 may monitor the anti-theft sensor 140 of the key receiver receptacle 114. In block 906, the system controller 150 checks whether the user-customizable key receiver 112 has been inserted for the first time. If not, the method 900 loops back to block 902 to continue monitoring for insertion of the user-customizable key receiver 112. If the user-customizable key receiver 112 has been inserted, the method 900 advances to block 908.

In block 908, the system controller 150 sends a PUF challenge to the PUF circuit 200 of the user-customizable key 110. Of course, the user-customizable key 110 must be inserted into the user-customizable key receiver 112 in order for the PUF circuit 200 to receive the PUF challenge. In some embodiments, in block 910, the system controller 150 may apply a power signal to the PUF circuit 200 in order to send the PUF challenge. In block 912, the system controller 150 receives a response from the PUF circuit 200 of the user-customizable key 110. The response may be embodied as any voltage signal, current signal, or other signal generated by the PUF circuit 200 in response to the PUF challenge.

In block 914, the system controller 150 sends a PUF challenge to the PUF circuit 300 of the user-customizable key receiver 112. Of course, the user-customizable key receiver 112 must be inserted into the key receiver receptacle 114 in order for the PUF circuit 300 to receive the PUF challenge. In some embodiments, in block 916, the system controller 150 may apply a power signal to the PUF circuit 300 in order to send the PUF challenge. In block 918, the system controller 150 receives a response from the PUF circuit 300 of the user-customizable key receiver 112. The response may be embodied as any voltage signal, current signal, or other signal generated by the PUF circuit 300 in response to the PUF challenge.

In block 920, the system controller 150 receives a user PIN value from the user-customizable key receiver 112. As described above in connection with FIG. 8, the PIN may be embodied as any secret value known to the user, such as a number, a password, a passphrase, or other secret value. The user PIN value may be stored in the memory 304 and/or memory 330 of the user-customizable key receiver 112. In some embodiments, the system controller 150 may receive the PIN itself as the user PIN value. In some embodiments, in block 922, the system controller 150 may receive a hash of the user PIN.

In block 924, the system controller 150 determines an authentication value based on the PUF responses from the PUF circuits 200, 300 and the user PIN value. In some embodiments, the authentication value may also be based on a PUF response received from the PUF circuit 400 of the key receiver receptacle 114. Because the key receiver receptacle 114 is installed in the protected system 104 (e.g., the vehicle) and is not personalized by the user, the system controller 150 may determine the PUF response for the PUF circuit 400 ahead of time, for example during manufacture. In block 926, the system controller 150 stores the PUF responses and the authentication value. After storing the PUF responses and the authentication value, the method 900 is complete, and the system 100 is prepared to control unlocking of the protected system 104.

Figure 10:
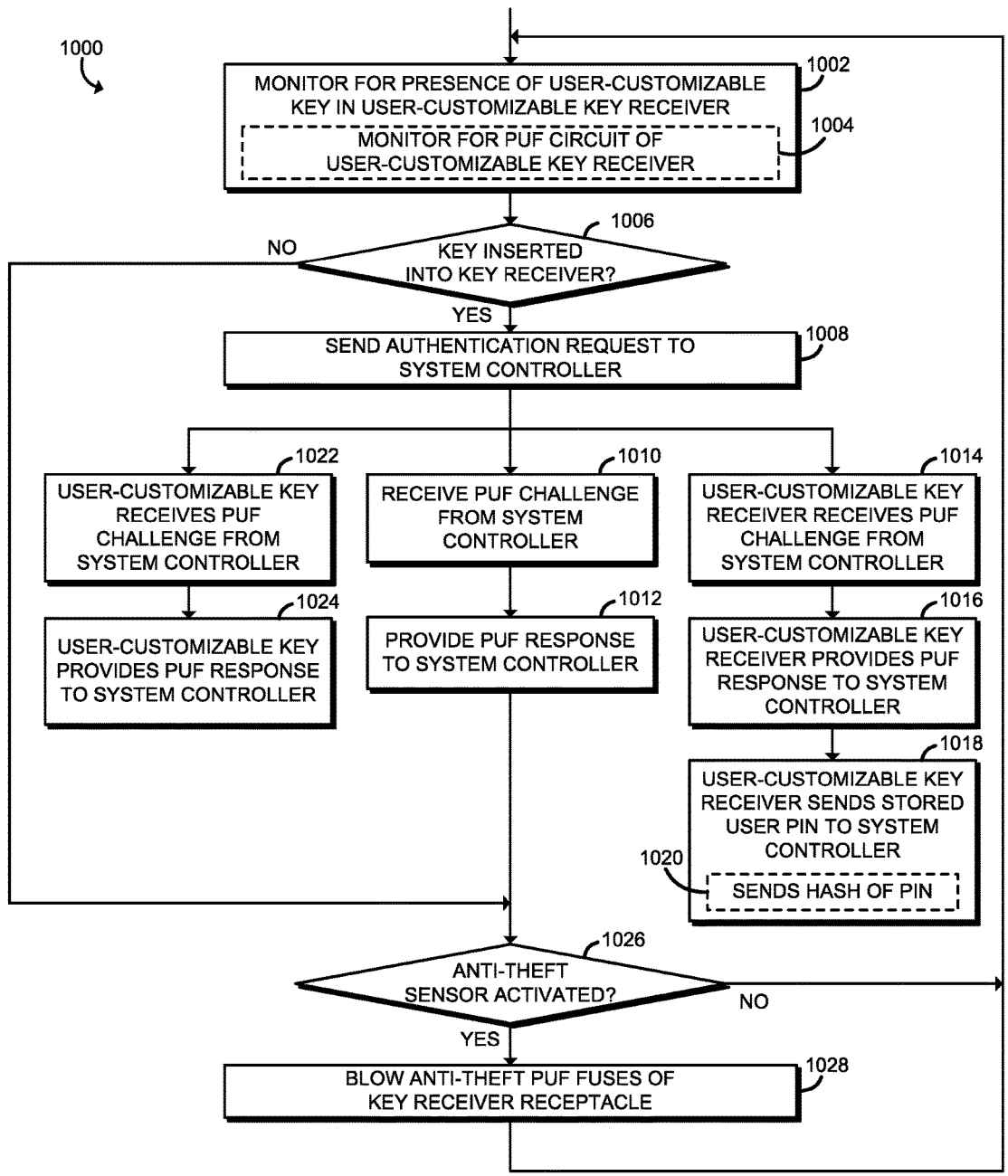
FIG. 10 is a simplified flow diagram of at least one embodiment of a method for requesting authentication that may be executed by the user-customizable locking assembly of FIG. 1.

Referring now to FIG. 10, in use, the user-customizable locking assembly 102 may execute a method 1000 for requesting authentication. The method 1000 may be executed, for example, when requesting the system controller 150 to unlock the protected system 104. The method 1000 begins in block 1002, in which the user-customizable locking assembly 102 monitors for the presence of the user-customizable key 110 in the user-customizable key receiver 112. The user-customizable locking assembly 102 may use any technique to monitor for the presence of the user-customizable key 110. For example, the user-customizable key 110 may monitor for activation of tumblers or other mechanical locking features of the user-customizable key receiver 112, which indicate the physical presence of the user-customizable key 110. In some embodiments, in block 1004, the user-customizable locking assembly 102 may monitor for the presence of the PUF circuit 300 of the user-customizable key receiver 112.

In block 1006, the user-customizable locking assembly 102 checks whether the user-customizable key 110 has been inserted into the user-customizable key receiver 112. If not, the method 1000 branches ahead to block 1026, described below. If the user-customizable key 110 has been inserted, the method 1000 advances to block 1008.

In block 1008, the user-customizable locking assembly 102 sends an authentication request to the system controller 150. The user-customizable locking assembly 102 may use any appropriate technique to send a request to the system controller 150. For example, the key receiver receptacle 114 may activate one or more electrical signals or otherwise send a signal to the system controller 150. After sending the authentication request, the method 1000 proceeds in parallel to blocks 1010, 1014, 1022.

In block 1010, the key receiver receptacle 114 receives a PUF challenge from the system controller 150. For example, the PUF circuit 400 may receive a power signal or other challenge signal generated by the system controller 150. In block 1012, the key receiver receptacle 114 provides a PUF response to the system controller 150. For example, output from the PUF circuit 400 may be provided to the system controller 150. After providing the PUF response, the method 1000 advances to block 1026, which is described below.

Referring back to block 1008, after sending the authentication request, the method 1000 also advances in parallel to block 1014, in which the user-customizable key receiver 112 receives a PUF challenge from the system controller 150. For example, the PUF circuit 300 may receive a power signal or other challenge signal generated by the system controller 150. In block 1016, the user-customizable key receiver 112 provides a PUF response to the system controller 150. For example, output from the PUF circuit 300 may be provided to the system controller 150.

In block 1018, the user-customizable key receiver 112 sends a stored user PIN value to the system controller 150. As described above in connection with FIGS. 8 and 9, the PIN may be embodied as any secret value known to the user, such as a number, a password, a passphrase, or other secret value. The user PIN value may be stored in the memory 304 and/or memory 330 of the user-customizable key receiver 112. In some embodiments, the user-customizable key receiver 112 may send the PIN itself as the user PIN value. In some embodiments, in block 1020, the user-customizable key receiver 112 sends a hash of the PIN as the user PIN value to the system controller 150. After sending the user PIN value, the method 1000 is completed for the user-customizable key receiver 112.

Referring back to block 1008, after sending the authentication request, the method 1000 also advances in parallel to block 1022, in which the user-customizable key 110 receives a PUF challenge from the system controller 150. For example, the PUF circuit 200 may receive a power signal or other challenge signal generated by the system controller 150. In block 1024, the user-customizable key 110 provides a PUF response to the system controller 150. For example, output from the PUF circuit 200 may be provided to the system controller 150. After providing the PUF response, the method 1000 is completed for the user-customizable key 110.

Referring back to block 1012, after providing the PUF responses to the system controller 150, the method 1000 advances to block 1026, in which the key receiver receptacle 114 determines whether the anti-theft sensor 140 is activated. The anti-theft sensor 140 may be disengaged, tripped, or otherwise activated when the user-customizable key receiver 112 is removed from the key receiver receptacle 114. The user-customizable key receiver 112 being removed from the key receiver receptacle 114 may an attempted theft or other attempt to defeat the user-customizable locking assembly 102. If the anti-theft sensor 140 has not been activated, the method 1000 loops back to block 1002 to continue monitoring for the presence of the user-customizable key 110. If the anti-theft sensor 140 has been activated, the method 1000 advances to block 1028, in which the key receiver receptacle 114 blows one or more anti-theft fuses 402 of the PUF circuit 400. Blowing the anti-theft fuses 402 modifies the PUF response of the key receiver receptacle 114 and thus allows the system controller 150 to detect that the user-customizable key receiver 112 has been removed. The system controller 150 may, for example, fail to authenticate the key receiver receptacle 114 if the PUF response changes. After blowing the fuses, the method 1000 loops back to block 1002 to continue monitoring for the presence of the user-customizable key 110. Of course, although illustrated as part of the method 1000, it should be understood that the anti-theft functions of blocks 1026, 1028 may be performed at a different time, in a different order, or otherwise independently from the other operations of the method 1000.

Figure 11:
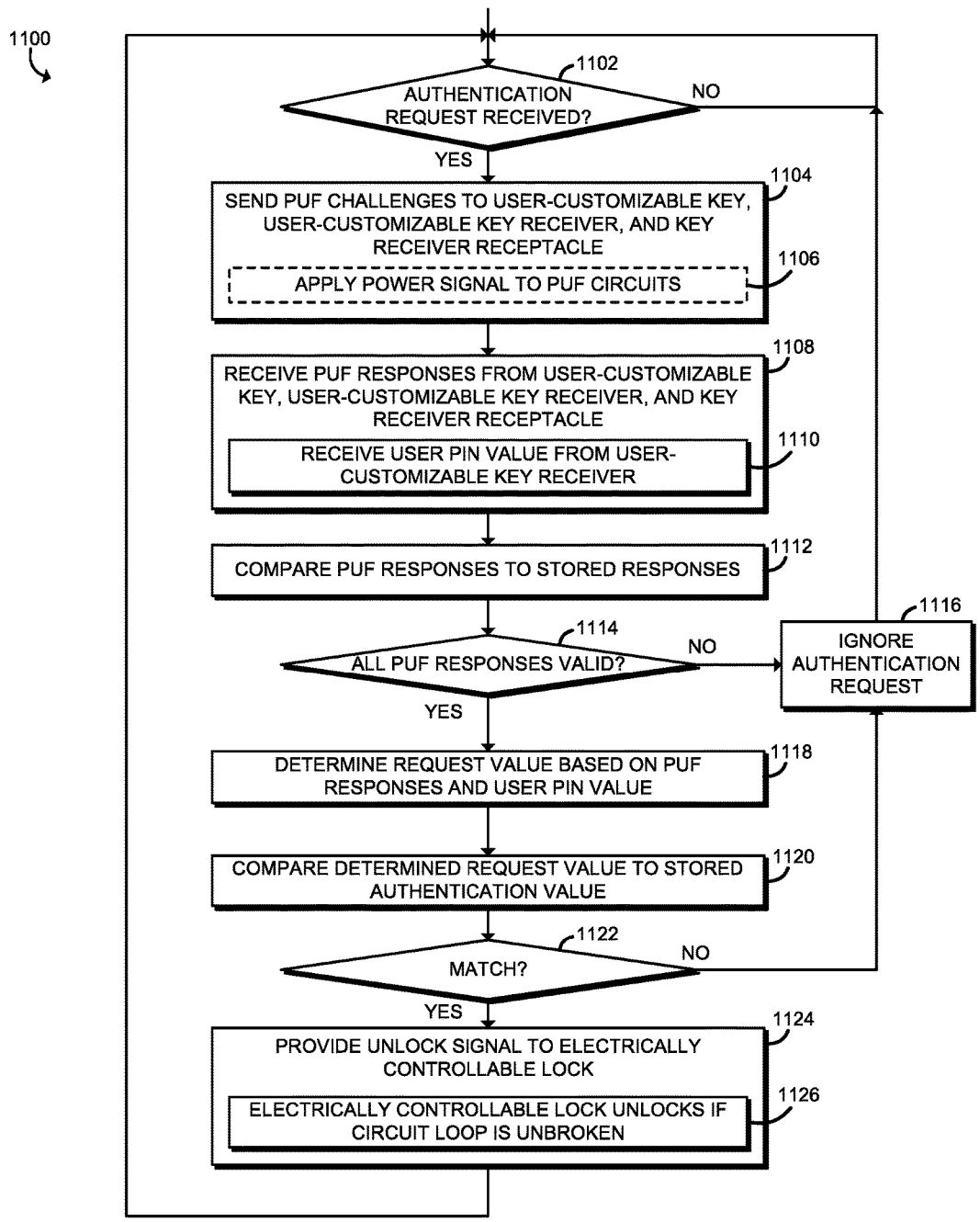
FIG. 11 is a simplified flow diagram of at least one embodiment of a method for authenticating the user-customizable locking assembly that may be executed by a system controller of a protected system of FIG. 1.

Referring now to FIG. 11, in use, the system controller 150 may execute a method 1100 for authenticating the user-customizable locking assembly 102. The method 1100 begins in block 1102, in which the system controller 150 determines whether an authentication request has been received from the user-customizable locking assembly 102. An authentication request may be generated by the user-customizable locking assembly 102 as described above in connection with FIG. 10. If no authentication request has been received, the method 1100 loops back to block 1102 to continue monitoring for authentication requests. If an authentication request has been received, the method 1100 advances to block 1104.

In block 1104, the system controller 150 sends PUF challenges to the user-customizable key 110, the user-customizable key receiver 112, and the key receiver receptacle 114. In some embodiments, in block 1106, the system controller 150 may apply a power signal to the PUF circuits 200, 300, 400 of the user-customizable key 110, the user-customizable key receiver 112, and the key receiver receptacle 114, respectively.

In block 1108, the system controller 150 receives PUF responses from the user-customizable key 110, the user-customizable key receiver 112, and the key receiver receptacle 114. The response may be embodied as any voltage signal, current signal, or other signal generated by the corresponding PUF circuit 200, 300, 400 of the user-customizable key 110, the user-customizable key receiver 112, and the key receiver receptacle 114. In block 1110, the system controller 150 receives a user PIN value from the user-customizable key receiver 112. As described above in connection with FIGS. 8-10, the PIN may be embodied as any secret value known to the user, such as a number, a password, a passphrase, or other secret value. The user PIN value may be embodied as the PIN itself or as a hash of the PIN.

In block 1112, the system controller 150 compares the PUF responses received from the user-customizable locking assembly 102 to stored PUF responses. The PUF responses for the user-customizable key 110 and the user-customizable key receiver 112 may be stored by the system controller 150 during initialization of the user-customizable locking assembly 102, as described above in connection with FIG. 9. The system controller 150 may store the PUF response for the key receiver receptacle 114 at a different time, for example during manufacture. In block 1114, the system controller 150 determines whether all of the PUF responses are valid. That is, the system controller 150 determines whether all of the PUF responses match the corresponding stored PUF responses. If not, the method 1100 branches to block 1116, in which the system controller 150 ignores the request to authenticate the user-customizable locking assembly 102. For example, the system controller 150 may ignore a request to unlock the protected system 104. After ignoring the request, the method 1100 loops back to block 1102 to monitor for additional authentication requests. Referring back to block 1114, if all PUF responses are valid, the method 1100 advances to block 1118.

In block 1118, the system controller 150 determines a request value based on the PUF responses received from the user-customizable key 110, the user-customizable key receiver 112, and the key receiver receptacle 114, as well as the user PIN value received from the user-customizable key receiver 112. As described above, the user PIN value may be embodied as the PIN value itself or as a hash of the PIN. In block 1120, the system controller 150 compares the request value to a stored authentication value. The authentication value is also determined based on PUF responses from the user-customizable locking assembly 102 and the user PIN value, as described above in connection with block 924 of FIG. 9. Thus, if the request value does not match the authentication value, then one or more of the fuses 202, 302, 402 have been blown and/or the user PIN value supplied by the user-customizable key receiver 112 is incorrect. In block 1122, the system controller 150 determines whether the request value matches the authentication value. If not, the method 1100 branches to block 1116 and ignores the authentication request, as described above. If the request value matches the authentication value, the method 1100 proceeds to block 1124.

In block 1124, the system controller 150 provides an unlock signal to the electrically controllable lock 170. In particular, the system controller 150 may send the unlock signal to the controlled switch 160. In block 1126, the electrically controllable lock 170 unlocks if the circuit loop 230 is unbroken. As described above, each of the user-customizable key 110, the user-customizable key receiver 112, and the key receiver receptacle 114 includes part of the circuit loop 230. The circuit loop 230 is completed (i.e., unbroken) only when the user-customizable key 110 is inserted in the user-customizable key receiver 112, and the user-customizable key receiver 112 is inserted in the key receiver receptacle 114. The circuit loop 230 is coupled to the controlled switch 160. The controlled switch 160 is only capable of generating an output signal when the circuit loop 230 is unbroken. Thus, the controlled switch 160 may generate an output signal (e.g., a high-voltage signal) in response to receiving the unlock signal from the system controller 150 when the circuit loop 230 is unbroken. The output signal from the controlled switch 160 may be sent to the electrically controllable lock 170, which then unlocks the protected system 104. After unlocking the protected system 104, the method 1100 loops back to block 1102 to monitor for additional authentication requests.

EXAMPLES

Illustrative examples of the technologies disclosed herein are provided below. An embodiment of the technologies may include any one or more, and any combination of, the examples described below.

Example 1 includes a user-customizable locking assembly comprising: a user-customizable key having a first physical unclonable function (PUF) circuit, wherein the first PUF circuit comprises a plurality of fuses that are capable of activation to customize a response produced by the first PUF circuit in response to a challenge signal; a user-customizable key receiver having an aperture shaped to receive at least a portion of the user-customizable key and a second PUF circuit, wherein the second PUF circuit comprises a plurality of fuses that are capable of activation to customize a response produced by the second PUF circuit in response to a challenge signal; and a key receiver receptacle having an aperture shaped to receive at least a portion of the user-customizable key receiver and a third PUF circuit, wherein the third PUF circuit comprises a plurality of fuses that are capable of activation to change a response produced by the third PUF circuit in response to a challenge signal.

Example 2 includes the subject matter of Example 1, wherein the user-customizable key, the user-customizable key receiver, and the key receiver receptacle cooperate to close a circuit loop when the user-customizable key is received in the aperture of the user-customizable key receiver and the user-customizable key receiver is received in the aperture of the key receiver receptacle, and wherein the circuit loop is to provide, only when the circuit loop is closed, an activation signal to a controlled switch that controls activation of an electrically controllable lock.

Example 3 includes the subject matter of any of Examples 1 and 2, wherein the circuit loop is broken when either (i) the user-customizable key is removed from the user-customizable key receiver or (ii) when the user-customizable key receiver is removed from the key receiver receptacle.

Example 4 includes the subject matter of any of Examples 1-3, wherein the user-customizable key further includes a communication port configured to mate with a corresponding communication port of the user-customizable key receiver when the at least a portion of the user-customizable key is received in the aperture of the user-customizable key receiver.

Example 5 includes the subject matter of any of Examples 1-4, wherein the user-customizable key receiver further comprises a memory having stored therein a user personal identification number (PIN) value supplied by a user of the locking assembly.

Example 6 includes the subject matter of any of Examples 1-5, wherein the memory has stored therein a hash of the PIN supplied by the user of the locking assembly.

Example 7 includes the subject matter of any of Examples 1-6, wherein the memory forms a portion of the second PUF circuit.

Example 8 includes the subject matter of any of Examples 1-7, wherein the user-customizable key receiver further includes (i) a first communication port configured to mate with a corresponding communication port of the user-customizable key when the at least a portion of the user-customizable key is received in the aperture of the user-customizable key receiver and (ii) a second communication port configured to mate with a corresponding communication port of the key receiver receptacle when the at least a portion of the user-customizable key receiver is received in the aperture of the key receiver receptacle.

Example 9 includes the subject matter of any of Examples 1-8, wherein the at least a portion of the user-customizable key receivable in the aperture of the user-customizable key receiver comprises a shape that has been three-dimensionally printed, and wherein the user-customizable key receiver comprises a three-dimensional printed portion having the aperture defined therein, wherein the aperture includes a shape that corresponding to the shape of three-dimensionally printed shape of the user-customizable key.

Example 10 includes the subject matter of any of Examples 1-9, wherein the key receiver receptacle further includes a sensor that is engaged when the at least a portion of the user-customizable key receiver is received in the aperture of the key receiver receptacle and disengaged when the user-customizable key receiver is removed from the aperture.

Example 11 includes the subject matter of any of Examples 1-10, wherein the key receiver receptacle further includes a controller to activate one or more of the plurality of fuses of the third PUF circuit in response a determination that the sensor has been disengaged.

Example 12 includes the subject matter of any of Examples 1-11, wherein the key receiver receptacle further includes a local power supply to provide power to the controller to activate the one or more plurality of fuses.

Example 13 includes the subject matter of any of Examples 1-12, wherein: the user-customizable key is to receive a first challenge signal from a system controller of a protected system and provide a response to the system controller in response to the first challenge signal using the first PUF circuit; the user-customizable key receiver is to receive a second challenge signal from the system controller and provide (i) a response to the system controller in response to the second challenge signal using the second PUF circuit and (ii) a user personal identification number (PIN) value to the system controller; the key receiver receptacle is to receive a third challenge signal from the system controller and provide a response to the system controller in response to the third challenge signal using the third PUF circuit.

Example 14 includes a protected system comprising: a system controller; an electrically controllable lock; a controlled switch having an output electrically coupled to the electrically controllable lock to control activation of the electrically controllable lock, a first input electrically coupled to the system controller, and a second input; a key receiver receptacle having a first physical unclonable function (PUF) circuit and an output electrically coupled to the second input of the controlled switch, a user-customizable key receiver received in the key receiver receptacle and having a second PUF circuit; and a user-customizable key received in the user-customizable key receiver and having a third PUF circuit, wherein the system controller is to: transmit a challenge signal to each of the first, second, and third PUF circuits in response to receiving an authentication request from the key receiver receptacle, receive a response from each of first, second, and third PUF circuits in response to the corresponding challenge signal; determine whether the responses are valid; and provide an activation signal to the controlled switch in response to a determination that each of the responses is valid.

Example 15 includes the subject matter of Example 14, wherein: the first PUF circuit comprises a plurality of fuses that are capable of activation to change the response produced by the first PUF circuit in response to the corresponding challenge signal received from the system controller; the second PUF circuit comprises a plurality of fuses that are capable of activation to customize the response produced by the second PUF circuit in response to the corresponding challenge signal received from the system controller; and the third PUF circuit comprises a plurality of fuses that are capable of activation to customize the response produced by the third PUF circuit in response to the corresponding challenge signal received from the system controller.

Example 16 includes the subject matter of any of Examples 14 and 15, wherein the system controller comprises a memory having stored therein authenticated responses from each of the first, second, and third PUF circuits, and wherein to determine whether the responses are valid comprises to compare each response from the first, second, and third PUF circuits to a corresponding authenticated response stored in the memory.

Example 17 includes the subject matter of any of Examples 14-16, wherein: the user-customizable key receiver comprises a memory having stored therein a personal identification value (PIN) value and is further to provide the PIN value to the system controller in response to corresponding challenge signal received from the system controller, the system controller is further to determine a request value based on the received PIN value and the response from each of the first, second, and third PUF circuits and compare the request value to an authentication value stored in a memory of the system controller, wherein to provide the activation signal comprises to provide an activation signal to the controlled switch in response to a determination that (i) each of the responses is valid and (ii) the request value matches the authentication value.

Example 18 includes the subject matter of any of Examples 14-17, wherein the user-customizable key, the user-customizable key receiver, and the key receiver receptacle cooperate to close a circuit loop when the user-customizable key is received in the user-customizable key receiver and the user-customizable key receiver is received in the key receiver receptacle, wherein the circuit loop is electrically connected to the output of the key receiver receptacle to provide an activation signal to the controlled switch only when the circuit loop is closed and wherein the controlled switch is to electrically connect the first input and the output of the controlled switch when activated via the activation signal.

Example 19 includes the subject matter of any of Examples 14-18, wherein the circuit loop is broken when either (i) the user-customizable key is removed from the user-customizable key receiver or (ii) when the user-customizable key receiver is removed from the key receiver receptacle.

Example 20 includes the subject matter of any of Examples 14-19, wherein the key receiver receptacle further includes a sensor that is engaged when the user-customizable key receiver is received in key receiver receptacle and disengaged when the user-customizable key receiver is removed from the key receiver receptacle.

Example 21 includes the subject matter of any of Examples 14-20, wherein: the first PUF circuit comprises a plurality of fuses that are capable of activation to change the response produced by the first PUF circuit in response to the corresponding challenge signal received from the system controller, and the key receiver receptacle further includes a controller to activate one or more of the plurality of fuses of the first PUF circuit in response a determination that the sensor has been disengaged.

Example 22 includes a method for controlling access to a protected system, the method comprising: receiving, by a system controller of the protected system, an authentication request from a user-customizable locking assembly of the protected system; transmitting, by the system controller, a first challenge signal to a first physical unclonable function (PUF) circuit of a user-customizable key of the user-customizable locking assembly; transmitting, by the system controller, a second challenge signal to a second physical unclonable function (PUF) circuit of a user-customizable key receiver of the user-customizable locking assembly, wherein the user-customizable key is coupled to the user-customizable key receiver; transmitting, by the system controller, a third challenge signal to a third physical unclonable function (PUF) circuit of a key receiver receptacle of the user-customizable locking assembly, wherein the user-customizable key receiver is coupled to the key receiver receptacle; receiving, by the system controller, responses from each of the first, second, and third PUF circuits; determining, by the system controller, whether the responses from each of the first, second, and third PUF circuits are valid responses; and providing, by the system controller, an activation signal to a controlled switch to control activation of an electrically controllable lock of the protected system in response to a determination that each of the responses from the first, second, and third PUF circuits is valid.

Example 23 includes the subject matter of Example 22, and wherein receiving the authentication request comprise receiving the authentication request from the key receiver receptacle in response to a determination by the key receiver receptacle that (i) the user-customizable key is presently coupled to the user-customizable key receiver and (ii) the user-customizable key receiver is presently coupled to the key receiver receptacle.

Example 24 includes the subject matter of any of Examples 22 and 23, and wherein determining whether the responses from each of first, second, and third PUF circuits are valid responses comprises comparing values of the responses to stored response values previously received from each of the first, second, and third PUF circuits.

Example 25 includes the subject matter of any of Examples 22-24, and further comprising receiving, by the system controller, a personal identification number (PIN) value from the user-customizable key receiver in response to the second challenge signal.

Example 26 includes the subject matter of any of Examples 25-25, and further comprising: determining, by the system controller, a request value based on the responses from each of first, second, and third PUF circuits and the PIN value; comparing the request value to an authentication value previously determined based on a prior response from each of first, second, and third PUF circuits previously received during an initialization phase of the user-customizable locking assembly and a prior PIN value previously received from the user-customizable key receiver during the initialization phase, wherein providing the activation signal comprises providing the activation signal in response to a determination that the request value and the authentication value match.

Example 27 includes the subject matter of any of Examples 22-26, and further comprising: determining, by the system controller, whether the user-customizable key receiver has been received in the key receiver receptacle for a first time; determining, by the system controller, whether the user-customizable key has been received in the user-customizable key receiver; transmitting, by the system controller, a challenge signal to each of the first, second, and third PUF circuits; receiving, by the system controller, responses from each of the first, second, and third PUF circuits; receiving, by the system controller, a personal identification number (PIN) value from the user-customizable key receiver in response to one of the challenge signals; and determining, by the system controller, an authentication value based on the PIN value and the responses from each of the first, second, and third PUF circuits; and storing, by the system controller, the authentication value and the responses received from each of the first, second, and third PUFs circuits.

Example 28 includes the subject matter of any of Examples 22-27, and wherein determining whether the user-customizable key receiver has been received in the key receiver receptacle for a first time comprises monitoring a sensor of the key receiver receptacle that is engaged when the user-customizable key receiver is received in the key receiver receptacle.

Example 29 includes one or more machine-readable storage media comprising a plurality of instructions stored thereon that, when executed, causes a system controller of a protected system to perform the method of any of Examples 22-28.

Example 30 includes a protected system comprising means for performing the method of any of Examples 22-28.

Example 31 includes a system controller for controlling access to a protected system, the system controller comprising: means for receiving an authentication request from a user-customizable locking assembly of the protected system; means for transmitting a first challenge signal to a first physical unclonable function (PUF) circuit of a user-customizable key of the user-customizable locking assembly; means for transmitting a second challenge signal to a second physical unclonable function (PUF) circuit of a user-customizable key receiver of the user-customizable locking assembly, wherein the user-customizable key is coupled to the user-customizable key receiver; means for transmitting a third challenge signal to a third physical unclonable function (PUF) circuit of a key receiver receptacle of the user-customizable locking assembly, wherein the user-customizable key receiver is coupled to the key receiver receptacle; means for receiving responses from each of the first, second, and third PUF circuits; means for determining whether the responses from each of the first, second, and third PUF circuits are valid responses; and means for providing an activation signal to a controlled switch to control activation of an electrically controllable lock of the protected system in response to a determination that each of the responses from the first, second, and third PUF circuits is valid.

Example 32 includes the subject matter of Example 31, and wherein the means for receiving the authentication request comprise means for receiving the authentication request from the key receiver receptacle in response to a determination by the key receiver receptacle that (i) the user-customizable key is presently coupled to the user-customizable key receiver and (ii) the user-customizable key receiver is presently coupled to the key receiver receptacle.

Example 33 includes the subject matter of Examples 31 and 32, and wherein the means for determining whether the responses from each of first, second, and third PUF circuits are valid responses comprises means for comparing values of the responses to stored response values previously received from each of the first, second, and third PUF circuits.

Example 34 includes the subject matter of any of Examples 31-33, and further comprising means for receiving a personal identification number (PIN) value from the user-customizable key receiver in response to the second challenge signal.

Example 35 includes the subject matter of any of Examples 31-34, and further comprising: means for determining a request value based on the responses from each of first, second, and third PUF circuits and the PIN value; means for comparing the request value to an authentication value previously determined based on a prior response from each of first, second, and third PUF circuits previously received during an initialization phase of the user-customizable locking assembly and a prior PIN value previously received from the user-customizable key receiver during the initialization phase, wherein the means for providing the activation signal comprises means for providing the activation signal in response to a determination that the request value and the authentication value match.

Example 36 includes the subject matter of any of Examples 31-35, and further comprising: means for determining whether the user-customizable key receiver has been received in the key receiver receptacle for a first time; means for determining whether the user-customizable key has been received in the user-customizable key receiver; means for transmitting a challenge signal to each of the first, second, and third PUF circuits; means for receiving responses from each of the first, second, and third PUF circuits; means for receiving a personal identification number (PIN) value from the user-customizable key receiver in response to one of the challenge signals; and means for determining an authentication value based on the PIN value and the responses from each of the first, second, and third PUF circuits; and means for storing the authentication value and the responses received from each of the first, second, and third PUFs circuits.

Example 37 includes the subject matter of any of Examples 31-36, and wherein the means for determining whether the user-customizable key receiver has been received in the key receiver receptacle for a first time comprises means for monitoring a sensor of the key receiver receptacle that is engaged when the user-customizable key receiver is received in the key receiver receptacle.

The invention claimed is:

1. A user-customizable locking assembly comprising:
a user-customizable key having a first physical unclonable function (PUF) circuit, wherein the first PUF circuit comprises a plurality of fuses that are capable of activation to customize a response produced by the first PUF circuit in response to a challenge signal;
a user-customizable key receiver having an aperture shaped to receive at least a portion of the user-customizable key and a second PUF circuit, wherein the second PUF circuit comprises a plurality of fuses that are capable of activation to customize a response produced by the second PUF circuit in response to a challenge signal; and
a key receiver receptacle having an aperture shaped to receive at least a portion of the user-customizable key receiver and a third PUF circuit, wherein the third PUF circuit comprises a plurality of fuses that are capable of activation to change a response produced by the third PUF circuit in response to a challenge signal.

2. The locking assembly of claim 1, wherein the user-customizable key, the user-customizable key receiver, and the key receiver receptacle cooperate to close a circuit loop when the user-customizable key is received in the aperture of the user-customizable key receiver and the user-customizable key receiver is received in the aperture of the key receiver receptacle, and
wherein the circuit loop is to provide, only when the circuit loop is closed, an activation signal to a controlled switch that controls activation of an electrically controllable lock.

3. The locking assembly of claim 2, wherein the circuit loop is broken when either (i) the user-customizable key is removed from the user-customizable key receiver or (ii) when the user-customizable key receiver is removed from the key receiver receptacle.

4. The locking assembly of claim 1, wherein the user-customizable key receiver further comprises a memory having stored therein a user personal identification number (PIN) value supplied by a user of the locking assembly.

5. The locking assembly of claim 4, wherein the memory has stored therein a hash of the PIN supplied by the user of the locking assembly.

6. The locking assembly of claim 4, wherein the memory forms a portion of the second PUF circuit.

7. The locking assembly of claim 1, wherein the user-customizable key receiver further includes (i) a first communication port configured to mate with a corresponding communication port of the user-customizable key when the at least a portion of the user-customizable key is received in the aperture of the user-customizable key receiver and (ii) a second communication port configured to mate with a corresponding communication port of the key receiver receptacle when the at least a portion of the user-customizable key receiver is received in the aperture of the key receiver receptacle.

8. The locking assembly of claim 1, wherein the at least a portion of the user-customizable key receivable in the aperture of the user-customizable key receiver comprises a shape that has been three-dimensionally printed, and
wherein the user-customizable key receiver comprises a three-dimensional printed portion having the aperture defined therein, wherein the aperture includes a shape that corresponding to the shape of three-dimensionally printed shape of the user-customizable key.

9. The locking assembly of claim 1, wherein the key receiver receptacle further includes a sensor that is engaged when the at least a portion of the user-customizable key receiver is received in the aperture of the key receiver receptacle and disengaged when the user-customizable key receiver is removed from the aperture.

10. The locking assembly of claim 9, wherein the key receiver receptacle further includes a controller to activate one or more of the plurality of fuses of the third PUF circuit in response a determination that the sensor has been disengaged.

11. The locking assembly of claim 1, wherein:
the user-customizable key is to receive a first challenge signal from a system controller of a protected system and provide a response to the system controller in response to the first challenge signal using the first PUF circuit;
the user-customizable key receiver is to receive a second challenge signal from the system controller and provide (i) a response to the system controller in response to the second challenge signal using the second PUF circuit and (ii) a user personal identification number (PIN) value to the system controller;
the key receiver receptacle is to receive a third challenge signal from the system controller and provide a response to the system controller in response to the third challenge signal using the third PUF circuit.

12. A protected system comprising:
a system controller;
an electrically controllable lock;
a controlled switch having an output electrically coupled to the electrically controllable lock to control activation of the electrically controllable lock, a first input electrically coupled to the system controller, and a second input;
a key receiver receptacle having a first physical unclonable function (PUF) circuit and an output electrically coupled to the second input of the controlled switch, wherein the first PUF circuit comprises a plurality of Rises that are capable of activation to change a response produced by the first PUF circuit in response to a corresponding challenge signal received from the system controller,
a user-customizable key receiver received in the key receiver receptacle and having a second PUF circuit; and
a user-customizable key received in the user-customizable key receiver and having a third PUF circuit,
wherein the system controller is to:
transmit a challenge signal to each of the first, second, and third PUF circuits in response to receiving an authentication request from the key receiver receptacle,
receive a response from each of first, second, and third PUF circuits in response to the corresponding challenge signal;
determine whether the responses are valid; and provide an activation signal to the controlled switch in response to a determination that each of the responses is valid.

13. The protected system of claim 12, wherein:
the second PUF circuit comprises a plurality of fuses that are capable of activation to customize the response produced by the second PUF circuit in response to the corresponding challenge signal received from the system controller; and
the third PUF circuit comprises a plurality of fuses that are capable of activation to customize the response produced by the third PUF circuit in response to the corresponding challenge signal received from the system controller.

14. The protected system of claim 12, wherein the system controller comprises a memory having stored therein authenticated responses from each of the first, second, and third PUF circuits, and
wherein to determine whether the responses are valid comprises to compare each response from the first, second, and third PUF circuits to a corresponding authenticated response stored in the memory.

15. The protected system of claim 12, wherein:
the user-customizable key receiver comprises a memory having stored therein a personal identification value (PIN) value and is further to provide the PIN value to the system controller in response to corresponding challenge signal received from the system controller,
the system controller is further to determine a request value based on the received PIN value and the response from each of the first, second, and third PUF circuits and compare the request value to an authentication value stored in a memory of the system controller,
wherein to provide the activation signal comprises to provide an activation signal to the controlled switch in response to a determination that (i) each of the responses is valid and (ii) the request value matches the authentication value.

16. The protected system of claim 12, wherein the user-customizable key, the user-customizable key receiver, and the key receiver receptacle cooperate to close a circuit loop when the user-customizable key is received in the user-customizable key receiver and the user-customizable key receiver is received in the key receiver receptacle,
wherein the circuit loop is electrically connected to the output of the key receiver receptacle to provide an activation signal to the controlled switch only when the circuit loop is closed and wherein the controlled switch is to electrically connect the first input and the output of the controlled switch when activated via the activation signal.

17. The protected system of claim 12, wherein the key receiver receptacle further includes a sensor that is engaged when the user-customizable key receiver is received in key receiver receptacle and disengaged when the user-customizable key receiver is removed from the key receiver receptacle.

18. The protected system of claim 17, wherein:
the first PUF circuit comprises a plurality of fuses that are capable of activation to change the response produced by
the first PUF circuit in response to the corresponding challenge signal received from the system controller, and the key receiver receptacle further includes a controller to activate one or more of the plurality of fuses of the first PUF circuit in response a determination that the sensor has been disengaged.

19. A method for controlling access to a protected system, the method comprising:
receiving, by a system controller of the protected system, an authentication request from a user-customizable locking assembly of the protected system;
transmitting, by the system controller, a first challenge signal to a first physical unclonable function (PUF) circuit of a user-customizable key of the user-customizable locking assembly, wherein the first PUF circuit comprises a plurality of fuses that are capable of activation to change a response produced by the first PUF circuit in response to the first challenge signal;
transmitting, by the system controller, a second challenge signal to a second physical unclonable function (PUF) circuit of a user-customizable key receiver of the user-customizable locking assembly, wherein the user-customizable key is coupled to the user-customizable key receiver;
transmitting, by the system controller, a third challenge signal to a third physical unclonable function (PUF) circuit of a key receiver receptacle of the user-customizable locking assembly, wherein the user-customizable key receiver is coupled to the key receiver receptacle;
receiving, by the system controller, responses from each of the first, second, and third PUF circuits;
determining, by the system controller, whether the responses from each of the first, second, and third PUF circuits are valid responses; and
providing, by the system controller, an activation signal to a controlled switch to control activation of an electrically controllable lock of the protected system in response to a determination that each of the responses from the first, second, and third PUF circuits is valid.

20. The method of claim 19, wherein receiving the authentication request comprise receiving the authentication request from the key receiver receptacle in response to a determination by the key receiver receptacle that (i) the user-customizable key is presently coupled to the user-customizable key receiver and (ii) the user-customizable key receiver is presently coupled to the key receiver receptacle.

21. The method of claim 19, wherein determining whether the responses from each of first, second, and third PUF circuits are valid responses comprises comparing values of the responses to stored response values previously received from each of the first, second, and third PUF circuits.

22. The method of claim 19, further comprising receiving, by the system controller, a personal identification number (PIN) value from the user-customizable key receiver in response to the second challenge signal.

23. The method of claim 22, further comprising:
determining, by the system controller, a request value based on the responses from each of first, second, and third PUF circuits and the PIN value;
comparing the request value to an authentication value previously determined based on a prior response from each of first, second, and third PUF circuits previously received during an initialization phase of the user-customizable locking assembly and a prior PIN value previously received from the user-customizable key receiver during the initialization phase, wherein providing the activation signal comprises providing the activation signal in response to a determination that the request value and the authentication value match.

24. The method of claim 19, further comprising:
determining, by the system controller, whether the user-customizable key receiver has been received in the key receiver receptacle for a first time;
determining, by the system controller, whether the user-customizable key has been received in the user-customizable key receiver;
transmitting, by the system controller, a challenge signal to each of the first, second, and third PUF circuits;
receiving, by the system controller, responses from each of the first, second, and third PUF circuits;
receiving, by the system controller, a personal identification number (PIN) value from the user-customizable key receiver in response to one of the challenge signals; and
determining, by the system controller, an authentication value based on the PIN value and the responses from each of the first, second, and third PUF circuits; and
storing, by the system controller, the authentication value and the responses received from each of the first, second, and third PUFs circuits.

25. The method of claim 24, wherein determining whether the user-customizable key receiver has been received in the key receiver receptacle for a first time comprises monitoring a sensor of the key receiver receptacle that is engaged when the user-customizable key receiver is received in the key receiver receptacle.

* * * * *